Jan. 16, 1945.    W. E. McCULLOCH    2,367,638
TOOL FOR LOOSENING TIRES
Filed July 10, 1941

INVENTOR.
W. E. McCulloch
BY Ray Bailey
Attorney

Patented Jan. 16, 1945

2,367,638

UNITED STATES PATENT OFFICE 2,367,638

TOOL FOR LOOSENING TIRES

William E. McCulloch, Des Moines, Iowa, assignor of one-half to Karl M. McCulloch, Des Moines, Iowa Application July 10, 1941, Serial No. 401,752

2 Claims. (Cl. 157—6)

This invention relates to tire tools. More specifically it relates to means and method for disengaging a tire from a rim or similar member.

One of the most strenuous and burdensome tasks connected with the repairing or changing of a tire is that of breaking that portion of the tire which engages the flanges and adjacent portions of the rim of the wheel loose from said rim after the tire has been positioned thereon for a substantial period of time. The problem has become especially acute with the introduction of what is commonly known as the "drop-center" type of tire and reaches its most aggravated stages in large truck, bus, and tractor tires. The common practice up to the present time has been to employ a hammer or other suitable device in virtually beating the tire loose from the rim by hitting the side portion of the casing adjacent the rim. Another common method employed is that of placing the tire and rim prone on the ground and jumping upon the casing with one's heels. In addition to it being a strenuous and in the case of some large, long-set tires an almost impossible task to loosen a tire from its rim by presently known methods and means, these methods and means are obviously very destructive to the tire casing for many a blow goes astray of its mark with the consequence that more than the absolute minimum amount of strain necessary is applied to the tire.

I have devised a means and method for disengaging tires from rims which permits the elimination of the present procedure together with its objectionable features.

It is an object of this invention to provide a novel device for breaking a tire loose from its rim.

Another object of this invention is to provide a novel method for breaking a tire loose from its rim.

Yet another object of this invention is to provide a device for loosening the tire from its rim which employs said rim or the supporting wheel as a support in the loosening operation.

A still further object of this invention is to provide a means and method for loosening a tire from its rim which exerts a minimum of strain on the tire casing.

Basically my invention involves the use of the rim itself or the wheel on which said rim is mounted as a support or rigid member against which force is applied in the process of loosening the tire from said rim.

Figure 1:
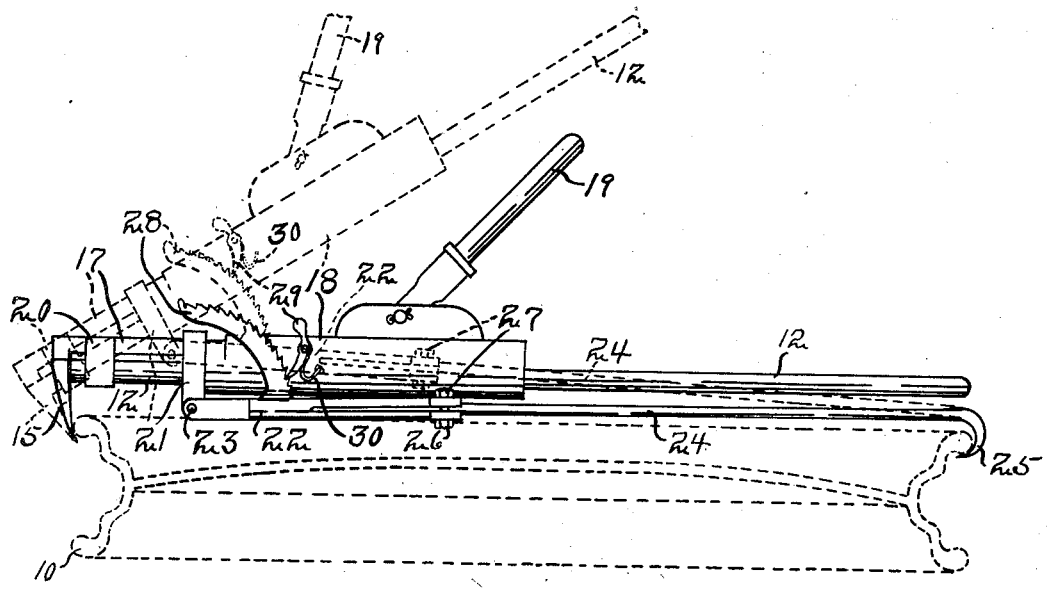
Figure 2:
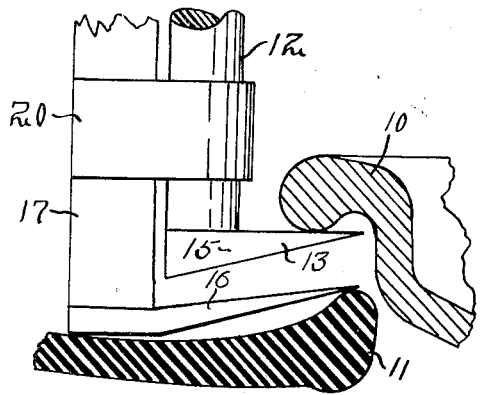
Figure 3:
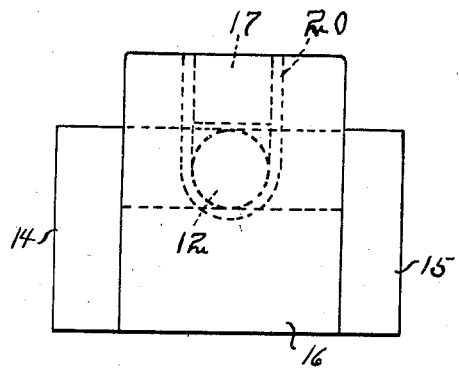
Figure 4:
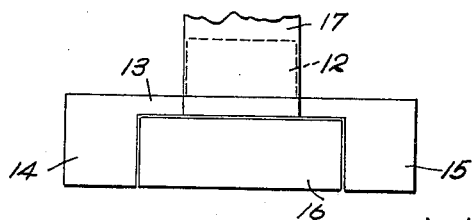

In order that a more clear and concise understanding of my invention may be had, reference should be made to the accompanying drawing forming a part of this specification in which Fig. 1 is a side elevation of one embodiment of my invention showing the same positioned upon a sectioned wheel and rim. Fig. 2 is the front-end portion, including the claws, of the device shown in Fig. 1 and shows also fragmentary cross-sections of a rim and tire which have been separated. Fig. 3 is a front-end elevation of the device shown in Fig. 1. Fig. 4 is a fractional rear elevation of the claw members shown in Fig. 2, but in their closed, or nesting, position.

Referring now more specifically to the drawing I have used the reference character 10 to designate a rim. 11 is the tire. On the forward end of the bar 12 is the claw 13 having the spaced apart claw fingers 14 and 15. The claw 16, when in starting position, is received between the claw fingers 14 and 15 whereby a minimum of thickness may be secured in that portion of the claw structure which is inserted between the tire and the rim. The claw 16 is secured to the forward end of the bar 17 which is operatively connected to any suitable type of jack mechanism 18 having the lever 19 for advancing the jack 18 along the length of the bar 12 with which it is operatively connected. Advancement of the jack 18 along the bar 12 obviously forces the claw 16 forward of the claw 13. A strap 20, in which the bar 12 is slidably received, may optionally be provided for maintaining the bar 12 and the bar 17 in desired position relative to one another. A collar 21 having a lug on which the clamp sleeve 22 is pivoted at 23 is mounted upon the jack 18. The arm 24 having the hooked end 25 has one of its end portions received in the sleeve 22. Loosening of the nut 26 on the bolt 27 permits adjustment of the precise amount of the arm 24 received in the sleeve 22. If deemed desirable a ratchet 28 may be mounted on the sleeve 22 and a pawl 29 adapted to operatively engage the ratchet 28 may be mounted upon the jack 18. A spring 30 tends to maintain the pawl 29 in engagement with the ratchet 28. These mounts may be varied.

In the using of my novel device the operator engages the hook 25 over a side flange of the rim 10 and loosens the nut 26 on the bolt 27 so that he may adjust the portion of the arm 24 which is received in the clamp sleeve 22 to such a point that the claws 13 and 16 engage the same side flange of the rim 10 at a point substantially diametrically opposite to that at which said hook 25 engages said flange. The operator next grasps the free end of the bar 12 and raises said end portion pivoting the bar 12 about its claw end. As the free end of the bar 12 is raised the clamp sleeve 22 and the sleeve end of the bar 24 are also raised and the sleeve 22 pivots at 23 on the collar 21. Continuing to raise the free end of the bar 12, therefore, necessarily brings the claws 13 and 16 and the hook 25 closer together with the result that the claws 13 and 16 are forced between the adjacent rim flange and the tire. The ratchet 28 and the pawl 29 if included in the structure serve to maintain the free end of the bar 12 in the elevated position to which it has been raised. When the claws 13 and 16 have been inserted sufficiently far between the rim and tire, the operator proceeds to manipulate the lever 19 causing the jack 18 to travel along the bar 12 forcing the claw 16 forward of the claw 13 until the adjacent portion of the tire 11 is forced away from and loosened from at least the adjacent portion of the proximate rim flange. If necessary in order to loosen the tire from the entire circumference of the rim flange, the operation may be repeated after repositioning the device so that the claw 16 will engage an unloosened portion of the tire. Normally, such a repetition is not required but in certain instances it may be. In adjusting the portion of the arm 24 which is received in the clamp sleeve 22, the operator may make the adjustment so that the claw portion of the device extends out onto the tire and somewhat beyond the adjacent portion of the rim flange as the device lies prostrate on the rim and tire before the free end of the bar 12 has been raised appreciably.

Any suitable means adapted to advancing one of the claws ahead of the other may be substituted for the jack 18.

It is immaterial to my invention whether the rim upon which the tire is mounted be detachable from the wheel or integrally formed therewith.

In the ensuing claims, unless otherwise indicated the term "wheel" is intended to include a rim attached to said wheel and also a rim disconnected from a wheel. The term "flange" is meant to include adjacent rim structure and/or portions of the rim with which the tire casing is in engagement and to which it may be adhered. "Claw" as used in the claims means any structure adapted to perform the general functions of the claws shown in the drawing.

My invention may be used for separating elements other than tires and rims.

I have described herein certain specific aspects of my invention for illustrative purposes. It is obvious, however, that one skilled in the art will be able to make numerous modifications of the precise structure described, and this without departing from the spirit and scope of my invention; I therefore wish to be limited herein only by the appended claims.

I claim:

1. A tire tool comprising an elongated bar, a casing slidably received on said bar, a claw member at one end of said bar, a second claw member mounted upon said casing and adapted to be disposed in a plane substantially coincident with the plane of said first claw member, means for causing said casing to travel along said bar whereby said claw memberss are separated, extensible arm structure having a hook at one of its ends, means for pivotally connecting the other end portion to said casing, the construction being such that raising of the free end of said bar from a prostrate position adjacent a horizontally disposed rim bearing a tire causes said hook to intimately engage a flange of said rim and causes said claws to be inserted between said flange and said tire at a juncture opposite to that at which said hook engages said flange and ratchet means for selectively maintaining said free end of said bar in elevated position during the operation of separating the claw members as aforesaid.

2. A tire tool comprising elongated structure, carrier means operatively connected to said elongated structure and adapted to travel therealong, a claw at one end of said elongated structure, a second claw mounted upon said carrier and adapted to be disposed in a plane substantially coincident with the plane of said first claw, means for causing said carrier to travel along said elongated structure whereby said claws are separated, elongated arm structure having a hook at one of its ends and means for pivotally connecting the other end portion of said arm structure to said carrier, the construction being such that raising of the free end of said bar from a prostrate position adjacent a horizontally disposed rim bearing a tire causes said hook to intimately engage a flange of said rim and causes said claws to be inserted between said flange and said tire at a juncture generally opposite to that at which said hook engages said flange.

WILLIAM E. McCULLOCH.